United States Patent
Chen

(10) Patent No.: US 10,333,743 B2
(45) Date of Patent: Jun. 25, 2019

(54) ELECTRONIC APPARATUS WITH POWER OVER COAXIAL CABLE FUNCTION

(71) Applicant: REC Technology Corporation, Taoyuan (TW)

(72) Inventor: Chien-Ming Chen, Taoyuan (TW)

(73) Assignee: REC Technology Corporation, Taoyuan (TW)

(*) Notice: Subject to any disclaimer, the term of this patent is extended or adjusted under 35 U.S.C. 154(b) by 0 days.

(21) Appl. No.: 15/821,760

(22) Filed: Nov. 23, 2017

(65) Prior Publication Data

US 2019/0089561 A1 Mar. 21, 2019

(30) Foreign Application Priority Data

Sep. 15, 2017 (TW) ............... 106131834 A

(51) Int. Cl.
*H04L 25/02* (2006.01)
*H04L 1/00* (2006.01)
*H04B 3/54* (2006.01)

(52) U.S. Cl.
CPC ......... *H04L 25/0278* (2013.01); *H04B 3/548* (2013.01); *H04L 1/0033* (2013.01); *H04B 2203/547* (2013.01)

(58) Field of Classification Search
CPC . H04B 3/54; H04B 3/56; H04B 3/548; H03H 7/38; H04L 25/0278
See application file for complete search history.

(56) References Cited

U.S. PATENT DOCUMENTS

| 8,064,179 | B2 | 11/2011 | Apfel |
| 9,547,318 | B1 | 1/2017 | Dwelley et al. |
| 9,577,707 | B1* | 2/2017 | Bernal ............... H04B 3/30 |
| 2002/0080010 | A1* | 6/2002 | Zhang ............... H04B 3/542 |
| | | | 375/257 |

(Continued)

FOREIGN PATENT DOCUMENTS

| CN | 205863886 | 1/2017 |
| TW | M493832 | 1/2015 |
| TW | M535915 | 1/2017 |

OTHER PUBLICATIONS

"Search Report of Europe Counterpart Application", dated Mar. 5, 2018, p. 1-p. 7.

*Primary Examiner* — Aristocratis Fotakis
(74) *Attorney, Agent, or Firm* — JCIPRNET

(57) ABSTRACT

An electronic apparatus with power over coaxial cable (PoC) function including a transmission port, a low-pass filter, a dynamic impedance circuit and a switching power converter is provided. The transmission port is coupled to a coaxial cable. The low-pass filter is coupled to the transmission port to receive a mixed signal from the coaxial cable and filter the mixed signal to obtain a first power. The dynamic impedance circuit is coupled to the low-pass filter to receive and store the first power and provide a second power accordingly. The switching power converter is coupled to the dynamic impedance circuit to receive the second power and convert the second power to an operation power. The dynamic impedance circuit changes an impedance thereof dynamically in response to a current change of the second power, so as to prevent a noise of the switching power converter from being feedback to the transmission port.

8 Claims, 7 Drawing Sheets

(56) References Cited

U.S. PATENT DOCUMENTS

| | | | |
|---|---|---|---|
| 2002/0174423 A1* | 11/2002 | Fifield | H03H 7/46 725/1 |
| 2004/0119556 A1* | 6/2004 | Lu | H03H 7/38 333/32 |
| 2006/0227884 A1* | 10/2006 | Koga | H04B 3/54 375/257 |
| 2007/0063330 A1* | 3/2007 | Park | H01C 1/148 257/686 |
| 2013/0187445 A1 | 7/2013 | Mutzabaugh | |
| 2015/0236728 A1* | 8/2015 | Suzuki | H04B 1/0458 455/127.1 |
| 2017/0104467 A1* | 4/2017 | Nikitin | H02J 50/10 |
| 2018/0177021 A1* | 6/2018 | Roberge | H04B 3/542 |

* cited by examiner

ELECTRONIC APPARATUS WITH POWER OVER COAXIAL CABLE FUNCTION

CROSS-REFERENCE TO RELATED APPLICATION

This application claims the priority benefit of Taiwan application serial no. 106131834, filed on Sep. 15, 2017. The entirety of the above-mentioned patent application is hereby incorporated by reference herein and made a part of this specification.

BACKGROUND OF THE INVENTION

Field of the Invention

The invention is related to an electronic apparatus, and particularly to an electronic apparatus with power over coaxial cable function.

Description of Related Art

In a power over coax (PoC) system, a master device can supply power via a power circuit and a low-pass circuit disposed therein as well as provide communication data via a transceiving circuit and a high-pass circuit disposed therein. The master device can load the communication data onto the power and transmit the same to a remote device via a coaxial cable. The remote device can perform low-pass filtering operation on a signal from the coaxial cable via the low-pass circuit disposed therein to obtain the power, and performs high-pass filtering operation on the signal from the coaxial cable via the high-pass circuit disposed therein to obtain the communication data. In this manner, the master device can achieve the objective of supplying power to and communicating with the remote device via the coaxial cable.

Generally speaking, it is required for the low-pass circuit of the master device and the low-pass circuit of the remote device to adopt a serial combination of a plurality of particular RLC circuits so as for them to match one another and prevent affecting the impedance characteristic of a data communication frequency band (high frequency band), thereby avoiding that a noise of the power is transmitted to the coaxial cable via the low-pass circuit and then affects the signal quality of the communication data. Once the signal quality of the communication data is affected, the communication between the master device and the remote device may fail. Accordingly, the matching of the low-pass circuit of the master device and the low-pass circuit of the remote device is highly important and plays a decisive role for the quality of the master device and remote device.

However, in the master device and the remote device, the plurality of particular RLC circuits adopted in the low-pass circuit makes the circuit design to become complex. In addition, when the remote device is to be designed for miniaturization, there is signal interference generated between elements in the plurality of RLC circuits due to close arrangement of the elements, making it difficult to design the circuit. In particular, if the remote device adopts a switching power converter to process power, then the noise generated during switching operation of the switching power converter is still likely to be feedback to the coaxial cable via the RLC circuits and interfere the communication data.

SUMMARY OF THE INVENTION

Accordingly, the invention provides an electronic apparatus with power over coaxial cable function to solve the problem described in Related Art.

An electronic apparatus of the invention includes a transmission port, a low-pass filter, a dynamic impedance circuit and a switching power converter. The transmission port is coupled to a coaxial cable to perform power and data transmission. The low-pass filter is coupled to the transmission port to receive a mixed signal from the coaxial cable and filter the mixed signal to obtain a first power. The dynamic impedance circuit is coupled to the low-pass filter to receive and store the first power and provide a second power accordingly. The switching power converter is coupled to the dynamic impedance circuit to receive the second power and covert a voltage of the second power into an operation power required for operation of the electronic apparatus. The dynamic impedance circuit changes an impedance thereof dynamically in response to a current change of the second power, so as to prevent a noise of the switching power converter from being feedback to the transmission port.

In an embodiment of the invention, when a current of the second power is larger than or equal to a reference current value in response to the switching operation of the switching power converter, the dynamic impedance circuit increases the impedance so as to maintain a current captured from the first power to be within the reference current value, thereby preventing the noise generated during switching operation of the switching power converter from being feedback to the transmission port.

In an embodiment of the invention, the dynamic impedance circuit includes a current limiter and a capacitor. The current limiter is coupled between the low-pass filter and the switching power converter for transmitting the first power and limiting the current captured from the first power. The capacitor is coupled between the current limiter and a ground terminal for storing energy according to the first power and cooperating with the current limiter to provide the second power.

In an embodiment of the invention, when the current of the second power is smaller than the reference current value, the current limiter uses the first power as the second power so as to charge the capacitor and supply power to the switching power converter.

In an embodiment of the invention, when the current of the second power is larger than or equal to the reference current value, the current limiter and the capacitor provide the second power to supply power to the switching power converter, and the current limiter limits the current of the first power to be within the reference current value.

In an embodiment of the invention, the low-pass filter is an inductor.

In an embodiment of the invention, the dynamic impedance circuit includes a bipolar junction transistor and a capacitor. An emitter terminal of the bipolar junction transistor is coupled to the low-pass filter. A collector terminal of the bipolar junction transistor is coupled to the switching power converter. A base terminal of the bipolar junction transistor receives a reference voltage so as to enable the bipolar junction transistor to be in an on-state. The capacitor is coupled between the collector terminal of the bipolar junction transistor and the ground terminal, and configured to store energy according to the first power and cooperate with the bipolar junction transistor to provide the second power.

In an embodiment of the invention, the dynamic impedance circuit includes a field-effect transistor and a capacitor. A source terminal of the field-effect transistor is coupled to the low-pass filter. A drain terminal of the field-effect transistor is coupled to the switching power converter. A gate terminal of the field-effect transistor receives the reference voltage so as to enable the field-effect transistor to be in an on-state. The capacitor is coupled between the drain terminal of the field-effect transistor and the ground terminal, and configured to store energy according to the first power and cooperate with the field-effect transistor to provide the second power.

In an embodiment of the invention, the dynamic impedance circuit includes a low dropout regulator and a capacitor. The low dropout regulator is coupled between the low-pass filter and the switching power converter to transmit the first power and limit the current captured from the first power. The capacitor is coupled between the low dropout regulator and the ground terminal, and configured to store energy according to the first power and cooperate with the low dropout regulator to provide the second power.

In summary, in the electronic apparatus provided in the embodiments of the invention, the dynamic impedance circuit can prevent the noise generated during switching operation of the switching power converter from being feedback to the coaxial cable, and avoid interfering the communication data on the coaxial cable. Therefore, it is not required for the low-pass filter in the electronic apparatus to adopt a serial combination of the plurality of RLC circuits to be matched with the low-pass filter of the master device on the other end of the coaxial cable. In this manner, not only that the difficulty and complexity of the circuit design of the electronic apparatus can be reduced, but also that miniaturization of electronic apparatus can be realized.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
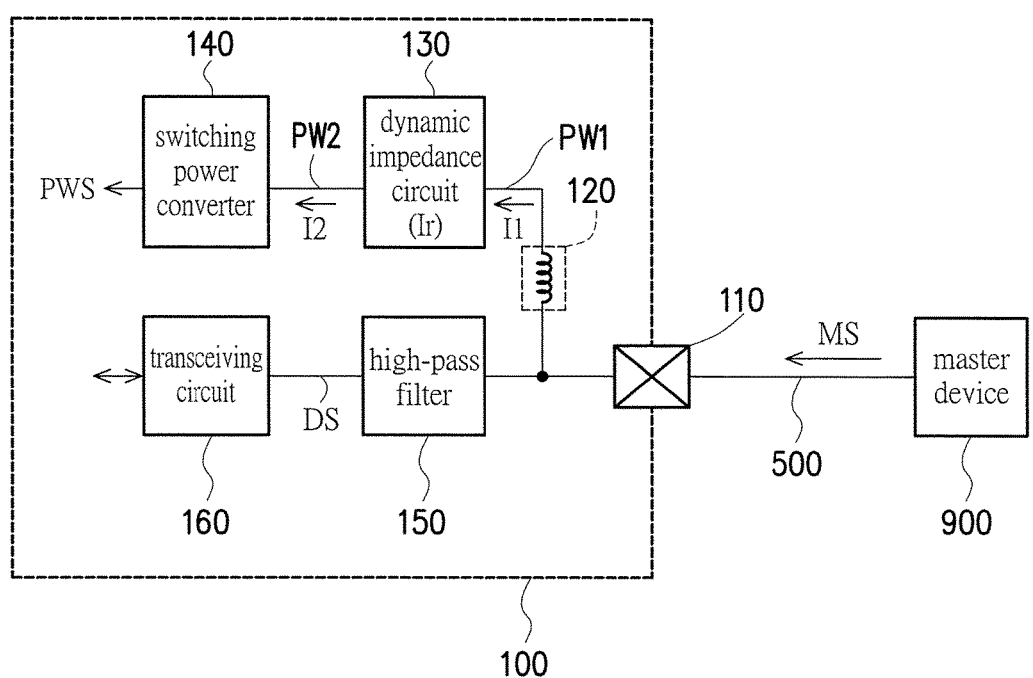
FIG. 1 is a schematic view of implementation and circuit block diagram of an electronic apparatus with power over coaxial cable function according to an embodiment of the invention.

In order to make the invention more comprehensible, several embodiments of the invention are introduced herein to describe the invention. Moreover, where possible, elements/components with the same reference numerals are used to represent the same or similar parts in the drawings and embodiments.

Referring to FIG. 1, FIG. 1 is a schematic view of implementation and circuit block diagram of an electronic apparatus 100 with power over coaxial cable function according to an embodiment of the invention. As shown in FIG. 1, a master device 900 is coupled to one end of a coaxial cable 500, and the electronic apparatus 100 is coupled to another end of the coaxial cable 500. The master device 900 may supply power to the electronic apparatus 100 via the coaxial cable 500. In addition, the master device 900 may communicate (or perform signal transmission) with the electronic apparatus 100 via the coaxial cable 500. Specifically, the master device 900 can mix a data signal with the power so as to generate and output a mixed signal MS to the coaxial cable 500.

As shown in FIG. 1, the electronic apparatus 100 may include a transmission port 110, a low-pass filter 120, a dynamic impedance circuit 130, a switching power converter 140, a high-pass filter 150 and a transceiving circuit 160, which should not be construed as a limitation to the invention. The transmission port 110 may be, for example, a coaxial cable connector for coupling to the coaxial cable 500 so as to perform power and data transmission with the master device 900. The low-pass filter 120 is coupled to the transmission port 110 to receive the mixed signal MS from the coaxial cable 500 and filter the mixed signal MS to obtain the first power PW1.

The dynamic impedance circuit 130 is coupled to the low-pass filter 120 to receive and store the first power PW1 so as to provide the second power PW2 accordingly. The switching power converter 140 is coupled to the dynamic impedance circuit 130 to receive the second power PW2, and converts the voltage of the second power PW2 so as to generate an operation power PWS required for operation of the electronic apparatus 100.

The high-pass filter 150 is coupled to the transmission port 110 to receive the mixed signal MS from the coaxial cable 500 and perform high-pass filtering operation on the mixed signal MS so as to obtain a data signal DS. The transceiving circuit 160 is coupled to the high-pass filter 150 to receive the data signal DS, and transmits the data signal DS to a rear circuit (not shown) of the electronic apparatus 100 to carry out subsequent signal processing operation.

In particular, the dynamic impedance circuit 130 may change impedance of the dynamic impedance circuit 130 dynamically in response to the current change of the second power PW2, so as to prevent the noise of the switching power converter 140 from being feedback to the transmission port 110 and the coaxial cable 500. In this manner, interference to the data signal DS in the mixed signal MS can be avoided, and thus failure of communication between the master device 900 and the electronic apparatus 100 can be prevented.

Furthermore, when a current I2 captured from the second power PW2 by the switching power converter 140 is smaller than the reference current value Ir, the impedance in the dynamic impedance circuit 130 is in a low-impedance state. Therefore, the dynamic impedance circuit 130 uses the first power PW1 as the second power PW2 so as to supply power to the switching power converter 140. At this time, the current I1 of the first power PW1 is smaller than the reference current value Ir.

When the switching power converter 140 performs switching operation and a current I2 captured from the second power PW2 is larger than or equal to the reference current value Ir, the dynamic impedance circuit 130 may increase the impedance therein so as to maintain the current I1 captured from the first power PW1 to be within the reference current value Ir, thereby preventing the noise generated during switching operation of the switching power converter 140 from being feedback to the transmission port 110 and the coaxial cable 500. In other words, when the switch in the switching power converter 140 is switched and the current I2 captured from the second power PW2 is changed dramatically, the current I1 of the first power PW1 does not exceed the reference current value Ir. In this manner, it can be avoided that the current I1 of the first power PW1 change dramatically, and spur noise can be prevented from being generated on the transmission port 110.

In an embodiment of the invention, the low-pass filter 120 may be, for example, an inductor, which should not be construed as a limitation to the invention.

In an embodiment of the invention, the switching power converter 140 may be, for example, a boost power converter or a buck power converter. The structure and operation regarding the various power converters mentioned above belong to technologies that are known to persons having ordinary skill in the art and thus no further descriptions are incorporated herein.

In an embodiment of the invention, the high-pass filter 150 may be realized via a common high-pass filter, and the transceiving circuit 160 may be realized via a known transmitting/receiving circuit, which should not be construed as a limitation to the invention.

Figure 2:
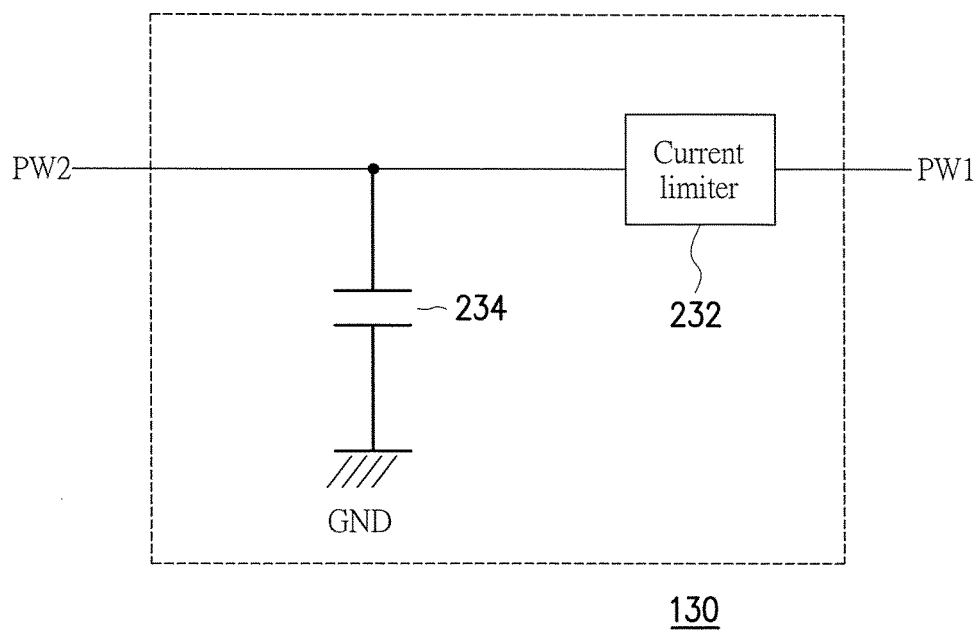
FIG. 2 is a schematic circuit block diagram of a dynamic impedance circuit according to an embodiment of the invention.

Referring to FIG. 1 and FIG. 2, FIG. 2 is a schematic circuit block diagram of a dynamic impedance circuit 130 according to an embodiment of the invention. The dynamic impedance circuit 130 may include a current limiter 232 and a capacitor 234, which should not be construed as a limitation to the invention. The current limiter 232 is coupled between the low-pass filter 120 (shown in FIG. 1) and the switching power converter 140 (shown in FIG. 1), and configured to transmit the first power PW1 to the capacitor 234 and limit the current I1 captured from the first power PW1. The capacitor 234 is coupled between the current limiter 232 and a ground terminal GND, and configured to store energy according to the first power PW1 and cooperate with the current limiter 232 to provide the second power PW2.

Figure 3A:
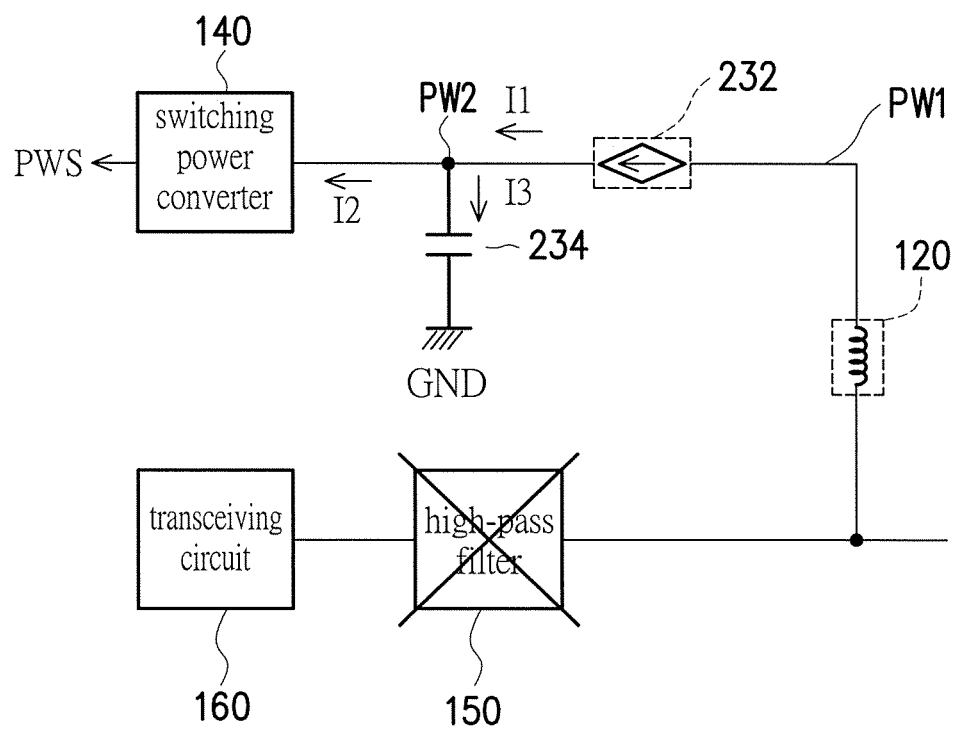
FIG. 3A and FIG. 3B are schematic equivalent circuit diagrams of an electronic apparatus that receives power according to the embodiment of the invention.
Figure 3B:
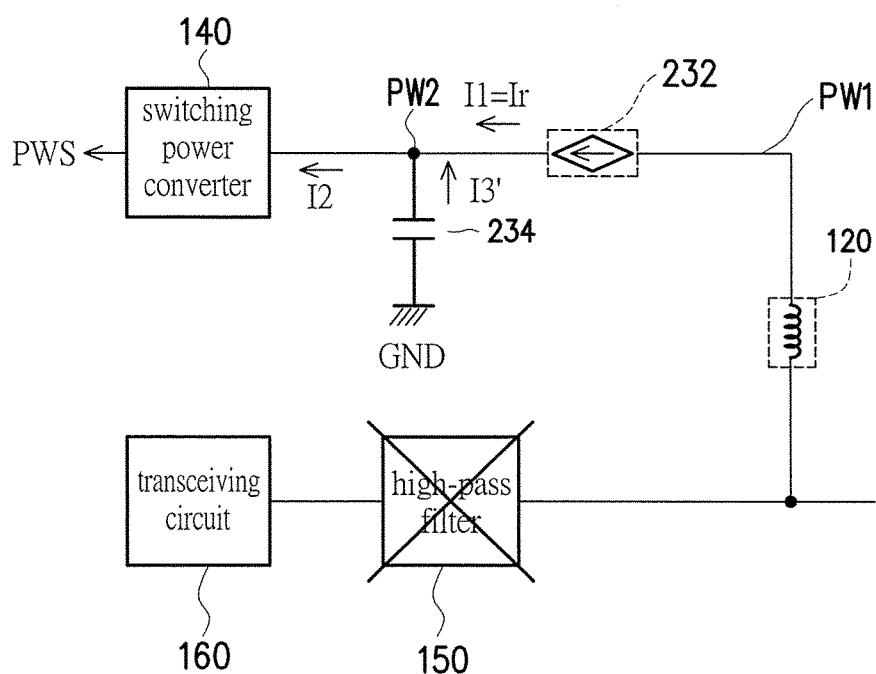

More detailed descriptions regarding operation of the electronic apparatus 100 in receiving power are provided below. Referring to FIG. 1, FIG. 3A and FIG. 3B together, FIG. 3A and FIG. 3B are schematic equivalent circuit diagrams of the electronic apparatus 100 that receives power according to the embodiment of the invention. Since the power provided by the master device 900 (shown in FIG. 1) is direct current (DC) power or low-frequency alternate current (AC) power which cannot pass through the high-pass filter 150, from the perspective of power, the high-pass filter 150 may be regarded as in an off-state. Relatively, the power can pass through the low-pass filter 120 to serve as the first power PW1. Therefore, from the perspective of power, the low-pass filter 120 may be regarded as in an on-state. In addition, the current limiter 232 may be equivalent to a controllable current and the maximum value of the provided current I1 is the reference current value Ir.

As shown in FIG. 3A, when the current I2 of the second power PW2 is smaller than the reference current value Ir, the current limiter 232 may use the first power PW1 as the second power PW2 so as to charge the capacitor 234 (via current I3) and supply power to the switching power converter 140 (via current I2) simultaneously.

On the contrary, as shown in FIG. 3B, when the current I2 of the second power PW2 is larger than or equal to the reference current value Ir, the current limiter 232 limits the current I1 of the first power PW1 to be within the reference current value Ir, and the limiter 232 cooperates with the capacitor 234 to provide the second power PW2 to supply power to the switching power converter 140. In other words, the current limiter 232 and the capacitor 234 perform parallel power supply to the switching power converter 140 via the current I1 and I3' respectively. It can be understood that, since the limiter 232 limits the current I1 captured from the first power PW1, the current limiting characteristic of the current limiter 232 may be substantially regarded as increasing the impedance of the dynamic impedance circuit 130.

Figure 4:
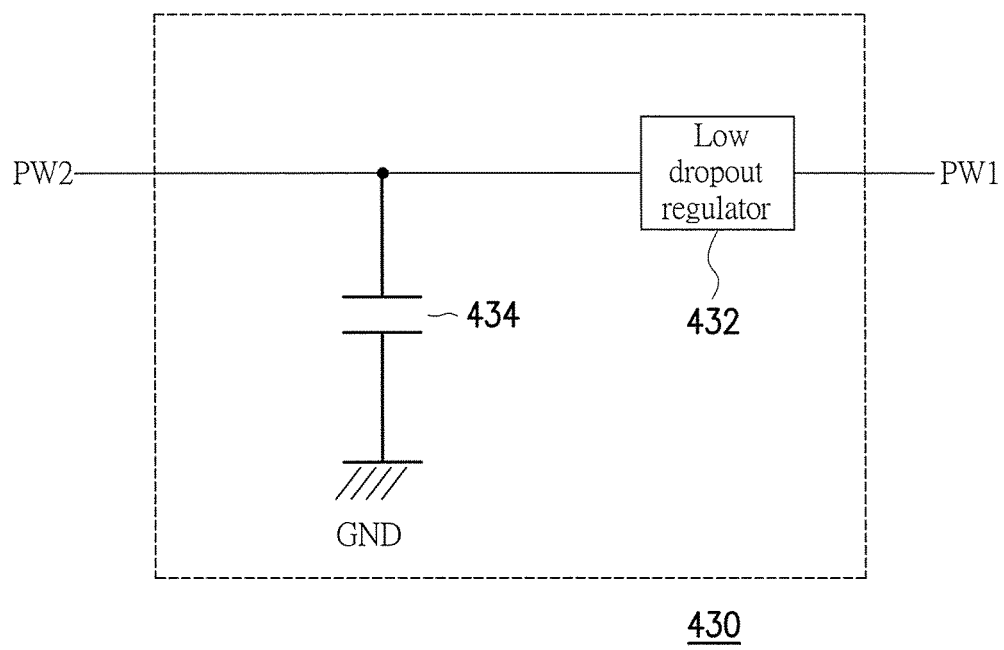
FIG. 4 is a schematic circuit block diagram of a dynamic impedance circuit according to another embodiment of the invention.

Referring to FIG. 1 and FIG. 4, FIG. 4 is a schematic circuit block diagram of a dynamic impedance circuit 430 according to another embodiment of the invention. The dynamic impedance circuit 430 may include a low dropout regulator (LDO) 432 and a capacitor 434, which should not be construed as a limitation to the invention. The LDO is coupled between the low-pass filter 120 (shown in FIG. 1) and the switching power converter 140 (shown in FIG. 1), and configured to transmit the first power PW1 and limit the current I1 captured from the first power PW1. The capacitor 434 is coupled between the LDO 432 and the ground terminal GND, and configured to store energy according to the first power PW1 and cooperate with the LDO 432 to provide the second power PW2. The LDO 432 may be realized by adopting a known regulating integrated circuit with current limiting function. Since the LDO 432 has the function of regulating voltage and limiting current, it can be avoided that the noise generated during switching operation of the switching power converter 140 is feedback to the coaxial cable 500.

Figure 5:
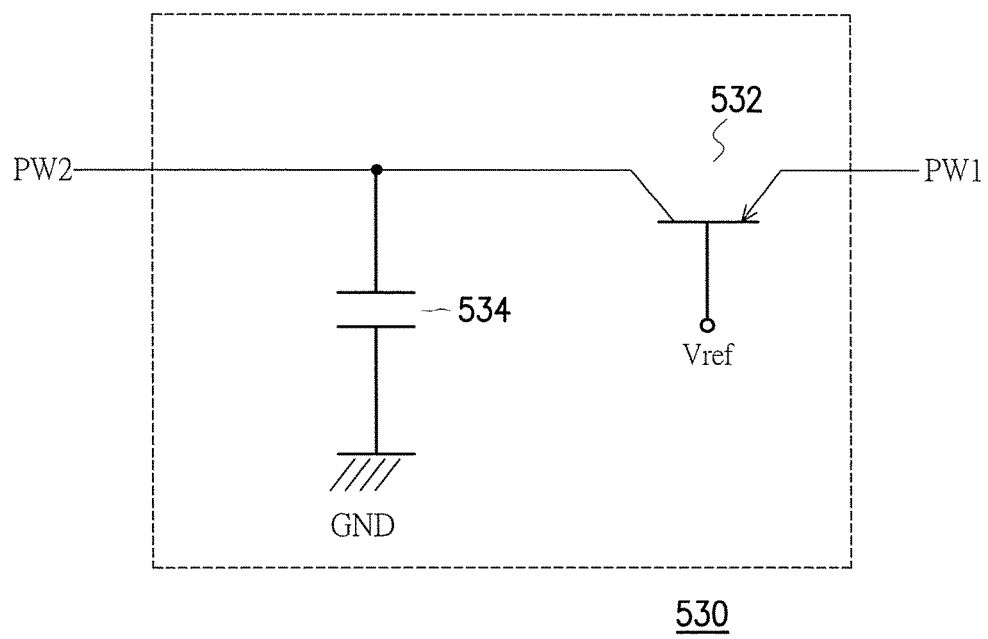
FIG. 5 is a schematic circuit block diagram of a dynamic impedance circuit according to still another embodiment of the invention.

Referring to FIG. 1 and FIG. 5, FIG. 5 is a schematic circuit block diagram of a dynamic impedance circuit 530 according to still another embodiment of the invention. The dynamic impedance circuit 530 may include a bipolar junction transistor (BJT) 532 and a capacitor 534, which should not be construed as limitation to the invention. An emitter terminal of the BJT 532 is coupled to the low-pass filter 120. A collector terminal of the BJT 532 is coupled to the switching power converter 140. A base terminal of the BJT 532 receives a reference voltage Vref so as to enable the BJT 532 to be in an on-state. The capacitor 534 is coupled between the collector terminal of the BJT 532 and the ground terminal GND for storing energy according to the first power PW1, and cooperates with the BJT 532 to provide the second power PW2. It can be understood that, since the BJT 532 inherently has the characteristics of dynamic impedance and current limitation, it can be avoided that the noise generated during switching operation of the switching power converter 140 is feedback to the coaxial cable 500. It should be mentioned that, although the BJT 532 illustrated in FIG. 5 is a pnp-type BJT, which should not be construed as a limitation to the invention, in other embodiments of the invention, the BJT 532 in FIG. 5 may be realized by adopting an npn-type BJT.

Figure 6:
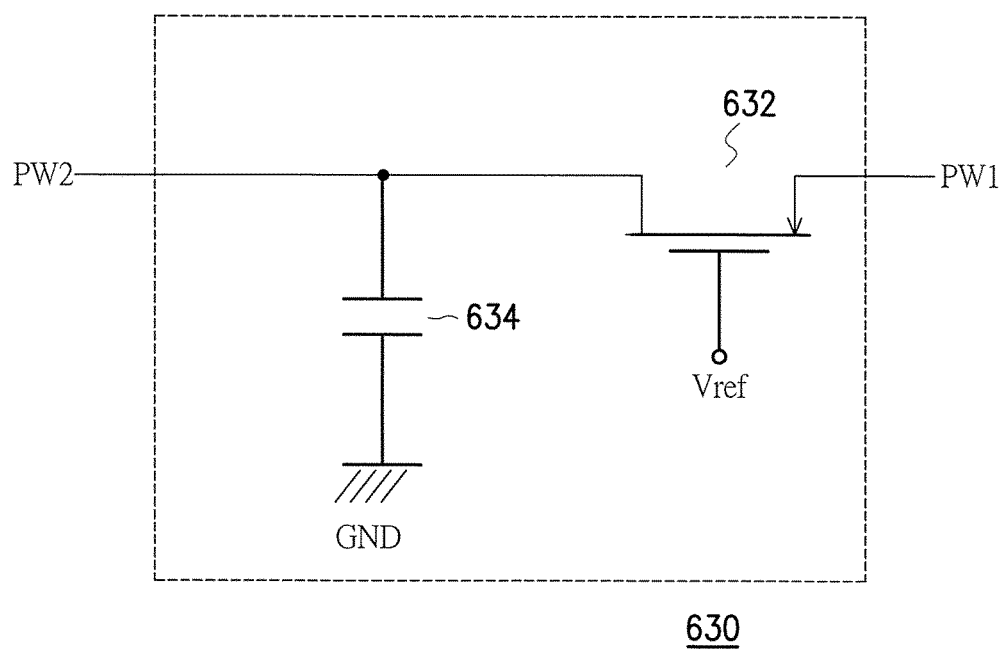
FIG. 6 is a schematic circuit block diagram of a dynamic impedance circuit according to yet another embodiment of the invention.

Referring to FIG. 1 and FIG. 6, FIG. 6 is a schematic circuit block diagram of a dynamic impedance circuit 630 according to yet another embodiment of the invention. The dynamic impedance circuit 630 may include a field-effect transistor (FET) 632 and a capacitor 634, which should not be construed as a limitation to the invention. A source terminal of the FET 632 is coupled to the low-pass filter 120.

A drain terminal of the FET 632 is coupled to the switching power converter 140. A gate terminal of the FET 632 receives the reference voltage Vref so as to enable the FET 632 to be in an on-state. The capacitor 634 is coupled between the drain terminal of the FET 632 and the ground terminal GND, and configured to store energy according to the first power PW1 and cooperate with the FET 632 to provide the second power PW2. It can be understood that, since the FET 632 inherently has the characteristics of dynamic impedance and current limitation (e.g., characteristic of saturation area of the FET), it can be avoided that the noise generated during switching operation of the switching power converter 140 is feedback to the coaxial cable 500. It should be mentioned that, although the FET 632 illustrated in FIG. 6 is a p-type metal-oxide-semiconductor field-effect transistor (PMOS), which should not be construed as a limitation to the invention, in other embodiments of the invention, the FET 632 in FIG. 6 may be realized by adopting other different types of FET.

In summary, in the electronic apparatus provided in the embodiments of the invention, the dynamic impedance circuit can prevent the noise generated during switching operation of the switching power converter from being feedback to the coaxial cable, thereby avoiding interfering the communication data on the coaxial cable. Therefore, it is not required for the low-pass filter in the electronic apparatus to adopt a serial combination of the plurality of RLC circuits to be matched with the low-pass filter of the master device on the other end of the coaxial cable. In this manner, not only that the difficulty and complexity of the circuit design of the electronic apparatus can be reduced, but also that miniaturization of electronic apparatus can be realized.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. An electronic apparatus with power over coaxial cable function, comprising:
    a transmission port, coupled to a coaxial cable to perform power and data transmission;
    a low-pass filter, coupled to the transmission port to receive a mixed signal from the coaxial cable, and filtering the mixed signal to obtain a first power;
    a dynamic impedance circuit, coupled to the low-pass filter to receive and store the first power and provide a second power accordingly; and
    a switching power converter, coupled to the dynamic impedance circuit to receive the second power, and converting a voltage of the second power to generate an operation power required for operation of the electronic apparatus,
    wherein the dynamic impedance circuit changes an impedance of the dynamic impedance circuit dynamically in response to a current change of the second power, so as to prevent a noise of the switching power converter from being feedback to the transmission port,
    wherein when a current of the second power is larger than or equal to a reference current value in response to a switching operation of the switching power converter, the dynamic impedance circuit increases the impedance so as to maintain a current captured from the first power to be within the reference current value, so as to prevent the noise generated during the switching operation of the switching power converter from being feedback to the transmission port.

2. The electronic apparatus according to claim 1, wherein the dynamic impedance circuit comprises:
    a current limiter, coupled between the low-pass filter and the switching power converter for transmitting the first power and limiting the current captured from the first power; and
    a capacitor, coupled between the current limiter and a ground terminal for storing energy according to the first power, and cooperating with the current limiter to provide the second power.

3. The electronic apparatus according to claim 2, wherein:
    when the current of the second power is smaller than the reference current value, the current limiter uses the first power as the second power so as to charge the capacitor and supply power to the switching power converter.

4. The electronic apparatus according to claim 2, wherein:
    when the current of the second power is larger than or equal to the reference current value, the current limiter and the capacitor provide the second power to supply power to the switching power converter, and the current limiter limits the current of the first power to be within the reference current value.

5. The electronic apparatus according to claim 1, wherein the low-pass filter is an inductor.

6. The electronic apparatus according to claim 1, wherein the dynamic impedance circuit comprises:
    a bipolar junction transistor, an emitter terminal of the bipolar junction transistor being coupled to the low-pass filter, a collector terminal of the bipolar junction transistor being coupled to the switching power converter, a base terminal of the bipolar junction transistor receiving a reference voltage so as to enable the bipolar junction transistor to be in an on-state; and
    a capacitor, coupled between the collector terminal of the bipolar junction transistor and a ground terminal, and configured to store energy according to the first power and cooperate with the bipolar junction transistor to provide the second power.

7. The electronic apparatus according to claim 1, wherein the dynamic impedance circuit comprises:
    a field-effect transistor, a source terminal of the field-effect transistor being coupled to the low-pass filter, a drain terminal of the field-effect transistor being coupled to the switching power converter, a gate terminal of the field-effect transistor receiving a reference voltage so as to enable the field-effect transistor to be in an on-state; and
    a capacitor, coupled between the drain terminal of the field-effect transistor and a ground terminal, and configured to store energy according to the first power and cooperate with the field-effect transistor to provide the second power.

8. The electronic apparatus according to claim 1, wherein the dynamic impedance circuit comprises:
    a low dropout regulator, coupled between the low-pass filter and the switching power converter to transmit the first power and limit the current captured from the first power; and
    a capacitor, coupled between the low dropout regulator and a ground terminal, and configured to store energy according to the first power and cooperate with the low dropout regulator to provide the second power.

* * * * *